United States Patent

[11] 3,618,972

| [72] | Inventor | Walter T. Buhl<br>Ann Arbor, Mich. |
|---|---|---|
| [21] | Appl. No. | 16,765 |
| [22] | Filed | Mar. 5, 1970 |
| [45] | Patented | Nov. 9, 1971 |
| [73] | Assignees | Ainsworth Industries Corporation<br>Toledo, Ohio ;<br>Frank M. Cobourn, executor of Harold F.<br>Hadley, deceased<br>, part interest to each |

[54] VALVE FOR A PNEUMATIC LEVELING SYSTEM
5 Claims, 9 Drawing Figs.
[52] U.S. Cl. .................................................... 280/124,
267/11
[51] Int. Cl. ..................................................... B60g 9/00
[50] Field of Search............................................ 280/124,
124 F, 6 H; 267/11

[56] References Cited
UNITED STATES PATENTS
3,074,739  1/1963  Alfieri .......................... 280/124 F
3,145,032  8/1964  Turek ........................... 280/124 F
*Primary Examiner*—Philip Goodman
*Attorney*—Owen & Owen ABSTRACT: A semiautomatic activating valve for a level control for a suspension system having pneumatic support means, such as shock absorbers or air bags. The suspension system has a feeler consisting of two relatively movable parts, one being fixed to either the sprung or the unsprung structure of the vehicle and the other being movable toward the other structure by air from a source under pressure, such as a tank or a compressor, that is fed to the feeler by manual actuation of the valve from closed to open position. The valve has retaining means which hold it in open position to supply air to the feeler which extends its movable part to sense the distance separating the sprung and unsprung structures. The feeler has two alternatively openable ports between the support means and (1) atmosphere or (2) the air supply line from the valve. When the sprung structure is too low, the feeler feeds air to the support means until the sprung structure moves up to predetermined "level" spacing and the feeler moves up therewith to its "level"position. When the sprung structure is too high, the feeler extends and opens the line from the support means to atmosphere to lower the sprung structure to "level" spacing which moves the feeler down, to close the vent line. The valve also comprises a piston which is responsive to a predetermined pressure in the air line from the valve to the feeler for restoring the valve to its closed position. This results when the feeler extends to or beyond its "level" position or if the sprung structure is low but the source air is unable to raise it at least to "level" position so the feeler cannot extend and the pressure in the feeler builds up.

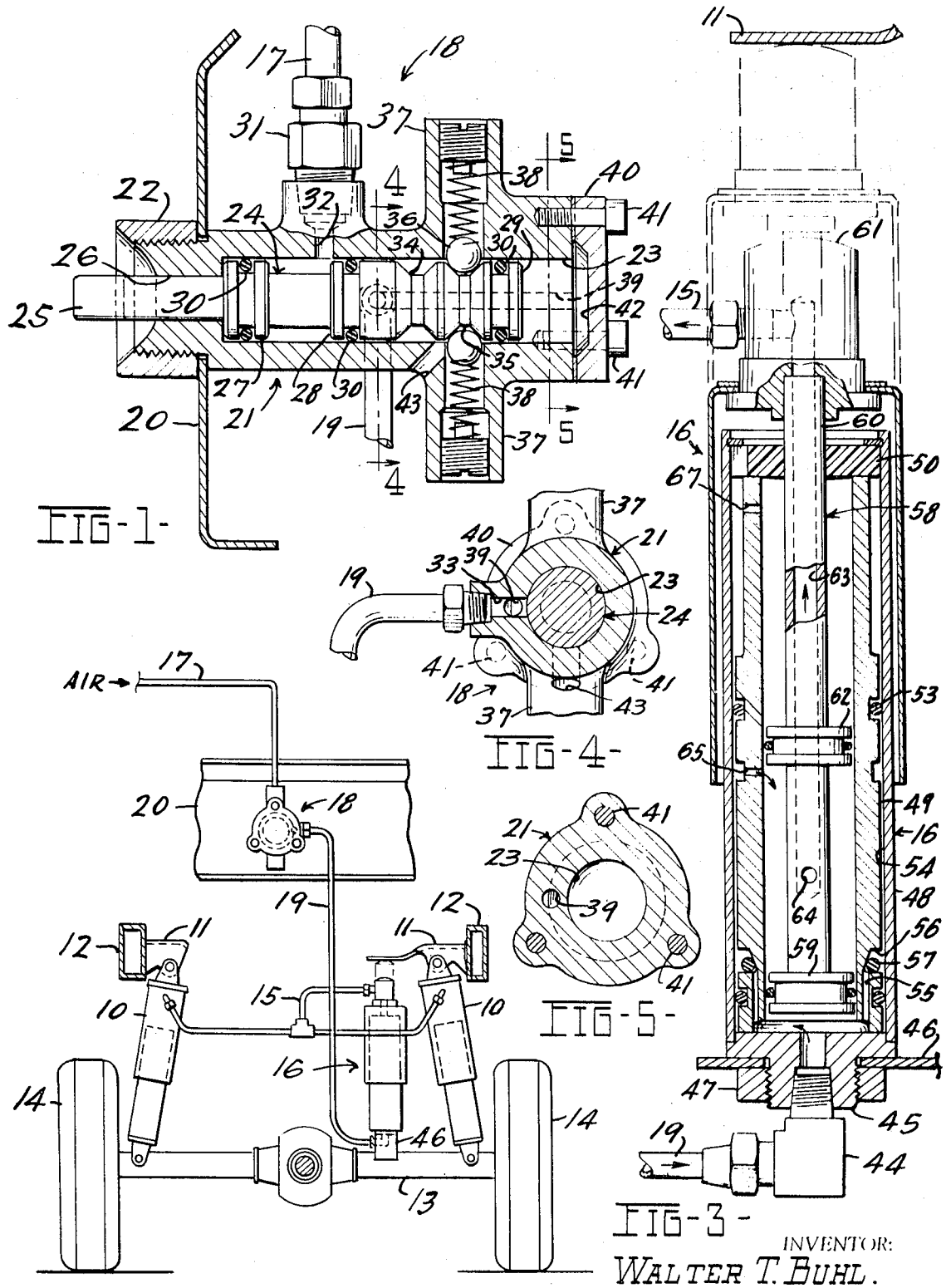

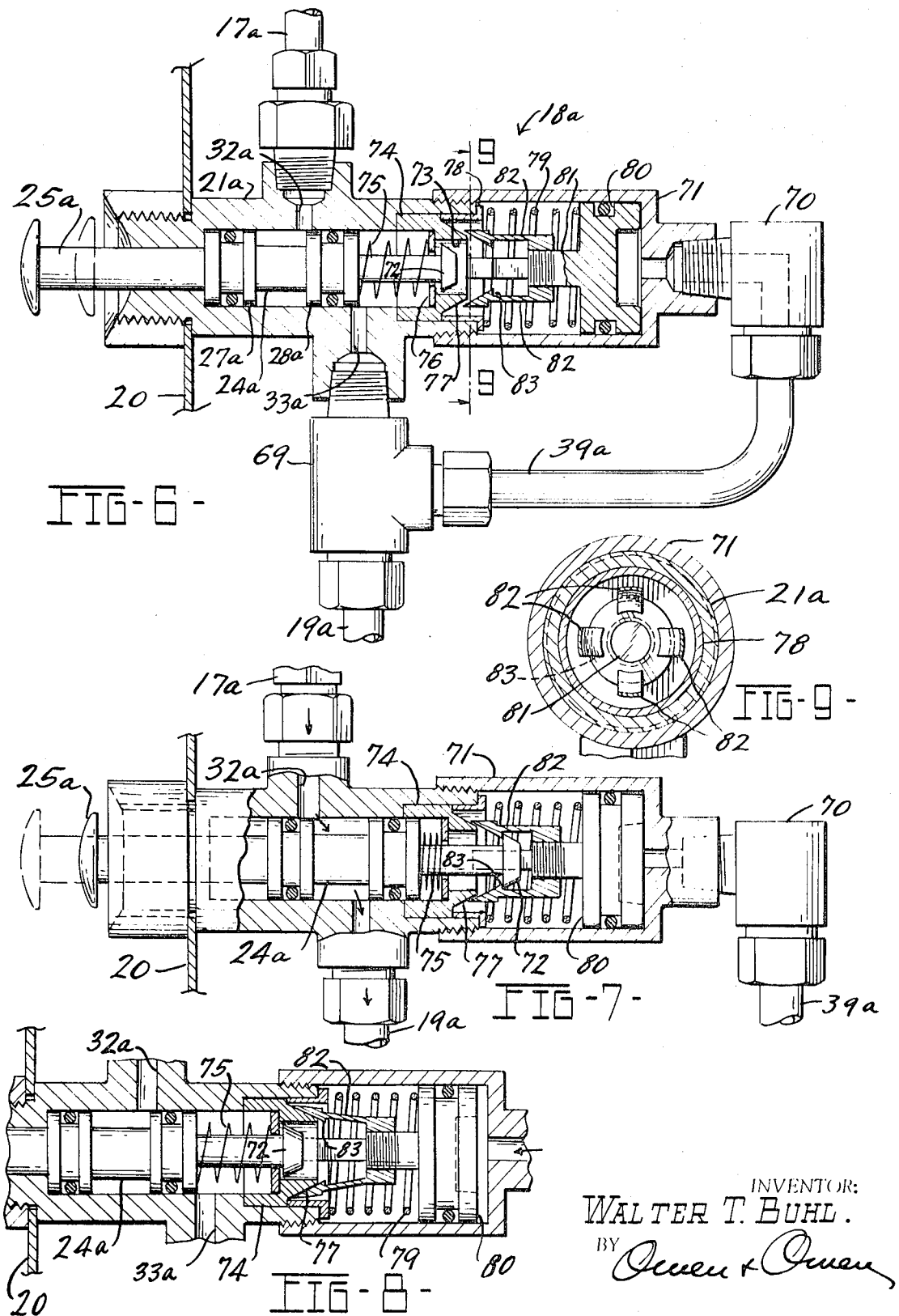

3,618,972

VALVE FOR A PNEUMATIC LEVELING SYSTEM

BACKGROUND OF THE INVENTION

The valve of the present invention is designed for use with a pneumatic level control for a vehicle such as an automobile or the like, for example, the level control disclosed in may copending application Ser. No. 868,471 filed Oct. 21 1969.

System of this type utilize pneumatic suspension means such as shock absorbers, or air bags in combination with coil springs, in order to support the sprung weight of a vehicle (i.e., the chassis and body) above its unsprung weight (i.e., the wheels and axles). As and when additional weight of passengers or cargo is placed in the vehicle or removed therefrom the change in the weight of the sprung portion of the vehicle in the suspension system being compressed or allowed to expand, thus changing the spacing between the sprung and unsprung portions of the vehicle away from the "normal" or "level"—0 spacing. Air is either supplied to or vented from the air suspension means in order to compensate for such a change in weight and to maintain the body and chassis of the vehicle at the "level." spacing from the axles and wheel of the vehicle.

Systems have been proposed wherein the driver of the vehicle merely actuates a simple two-way valve to feed air to the pneumatic shock absorbers of air bags when the vehicle body is low and to vent air therefrom when the vehicle body is high. Other systems have been suggested wherein valve means are connected between the sprung and unsprung structures and the valves are automatically actuated as they change from the standard "level." spacing to either too high or too low.

My copending application discloses a system wherein a pneumatically actuated device is extended to feel or sense the spacing between the sprung and unsprung structures of the vehicle whenever the driver has reason to believe that the spacing is improper, and as it so feels for this spacing, the mechanism either feeds air to or vents air from the pneumatic support means to restore the sprung and unsprung structures to their "level." spacing.

It is the principal object of the instant invention to provide a manually actuated, semiautomatic valve which the operator of the vehicle can press to test whether or not the spacing between the sprung and unsprung structures is correct and which automatically is restored to inactive position if the spacing is correct in the first place or after air has been added to or vented from the pneumatic support means and the spacing between the sprung and unsprung structures has been restored to its "level." distance.

It is yet another object of the instant invention to provide a manually activated semiautomatic valve which normally is in closed or inactive position and which, when activated by the operator feeds air under pressure to a position sensing or feeling means which senses the distance separating the sprung and unsprung structures of the vehicle and, feeds air to the pneumatic suspension means when the vehicle body and chassis are too low or determines that the vehicle body and chassis are too high and vents air from the pneumatic suspension means to lower them. In either case, the semiautomatic valve of the instant invention is automatically restored to its inactive position when the feeler or sensing means determines that the body and chassis have been raised to "level" spacing from the wheels and axles or that the body and chassis are above such level spacing and action is initiated to lower them to the predetermined level spacing.

BRIEF DESCRIPTION OF THE DRAWINGS

FIG. 1 is a vertical, sectional view on an enlarged scale of a semiautomatic valve embodying the instant invention;

FIG. 2 is a fragmentary, diagrammatic view illustrating connections between a valve embodying the instant invention, a feeler or sensing device according to my earlier application and pneumatic shock absorbers on a vehicle;

FIG. 3 is a vertical, sectional view with parts being shown in dotted lines of a feeler or sensing mechanism according to my earlier application;

FIG. 4 is a fragmentary, vertical, sectional view taken along the line 4—4 of FIG. 1;

FIG. 5 is a fragmentary, vertical sectional view taken along the line 5—5 of FIG. 1;

FIG. 6 is a view similar to FIG. 1 but of a second embodiment of the invention;

FIG. 7 is a view similar to FIG. 6 but showing the elements thereof in a different position;

FIG. 8 is a fragmentary sectional view in part similar to FIGS. 6 and 7, but showing the elements in yet another position; and FIG. 9 is a detailed, sectional view taken along the line 9—9 of FIG. 6 and showing a latching means employed in the embodiment of the invention illustrated in FIGS. 6–8, inclusive.

DESCRIPTION OF PREFERRED EMBODIMENT

A pneumatic suspension system of one of the types with which a semiautomatic valve embodying the invention is particularly adapted to be employed is fragmentarily illustrated in FIG. 2. The system comprises pneumatic shock absorbers 10 which extend between suitable brackets 11 welded or otherwise secured to chassis or frame members 12, and an axle, for example a rear axle 13. The shock absorbers 10 pneumatically and resiliently support the frame of the vehicle above the axle 13 and its wheels 14. Each of the shock absorbers 10 is connected to a common air line 15 leading to the upper end of a feeler mechanism generally indicated by the reference number 16, and shown in detail in FIG. 3. A first or supply line 17 leads from a source of air under pressure such as a tank, engine driven air pump or vacuum actuated pump such as the pump disclosed in Osborn U.S. Pat. No. 2,630,102 (not shown) to a valve embodying the instant invention and generally indicated by the reference number 18. The valve 18 controls the admission of air to a second air line 19 connected to the feeler 16. The valve 18 is mounted on the dashboard, fragmentarily indicated by the reference number 20, usually in a position of easy access by the hand of a vehicle operator.

The valve 18 has a main tubular body 21 one end of which protrudes through the dashboard 20 and, for example, may be secured therein by a locking nut 22. The body 21 has a center bore 23 in which is located a plunger 24, the forward (left) end of the plunger 24 being of reduced diameter to provide a pushbutton 25 which protrudes through a reduced diameter neck 26 of the body 21 and through the nut 22.

The plunger 24 is circular in cross section and has a series of collars 27, 28 and 29 spaced along its length between which there are located sealing rings 30.

The air supply line 17 is connected to the valve 18 by a coupling 31 threaded into an inlet port 32 which leads into the bore 23 in a point between the two sealing collars 27 and 28. The second air line 19 for air to the feeler 16 and thence to the shock absorbers 10 is coupled into an outlet port 33 (see FIG. 4) that opens into the bore 23 at a point beyond the second sealing collar 28 when the valve 18 is in closed or inactivated position as illustrated in FIG. 1. The longitudinal spacing between the bores 32 and 33 is such that when the pushbutton 25 is pressed to move the plunger 24 rearwardly (to the right of FIG. 1) the two sets of sealing collars 27 and 28 span the ports 32 and 33 and air can flow from the line 17 through the inlet port 32 and outlet port 33 to the line 19 and the feeler 16.

Two V-grooves 34 and 35 are machined in the plunger 24 rearwardly of sealing collars collars 28 and are spaced axially from each other a distance which determines the distance of movement of the plunger 24. The grooves 34 and 35 are alternately engaged by spring pressed detent balls 36 that are positioned in the lower ends of the two drilled bosses 37 and urged inwardly by springs 38. In the closed or inactivated position of the valve 18, illustrated in FIG. 1, the two detent balls 36 are engaged in the rearward V-groove 35 to retain the valve plunger 24 in its forward or closed position. In this position the sealing ring 30 of the collars 28 closes off the inlet port 32 from the outlet part 33.

When the pushbutton 25 is pushed inwardly, the detent balls 36 cam upwardly out of the groove 35 and snap into the groove 34 to retain the plunger 24 in its rear position (not shown) placing the inlet and outlet ports 32, 33 in communication as described above.

The second air line 19 also communicates with the interior bore 23 of the valve 18 through an axially extending passageway 39 drilled in the wall of the valve body 21 and leading to the innermost end of the valve body 21. A cap 40 that is secured on the end of the valve 21 by machine screws 41, has a recess 42 of sufficient diameter to embrace the ends f the bore 23 and the passageway 39 thus of the second air line 19 in direct communication with the bore 23 behind (to the right) the third set sealing collars 29. An atmospheric vent 43 is drilled through the wall of the valve body 21 in the section thereof between the third set of sealing collars 28 and 29.

The second air line 19 is connected by a coupling 44 (FIG. 3) to the lower end of the feeler mechanism 16. The feeler mechanism 16 has an end plug 45 which extends through an opening in a mounting saddle 46 and is secured therein by a locking nut 47. The end plug 45 mounts a tubular jacket 48 in which there is located a tubular liner 49. The liner rests on the end plug 45 and the upper end of the liner 49 contacts a spacing collar 50 which is retained in the jacket 48 by a snapring 51. O-rings 52 and 53 seal the exterior of the liner 49 to the interior of the jacket 48 defining therebetween an annular chamber 54. Axial passageways 55 are drilled in the end of the liner 49, bypassing the O-ring 52, and leading from the open lower end of the liner 49 to the inner side of a check ring recess 56. The recess 56 is located above the O-ring 52 and has an outwardly flared inner wall. An expandable O-ring 57 is located in the recess 56 to function as a check valve.

The liner 49 serves as a cylinder for a movable piston 58 which is extended upwardly by admission of air into the lower end of the liner 49 beneath a lower piston head 59 of the piston 58. The piston 58 has an upper stem 60 which extends through the collar 50 and carries a contact head 61 on its uppermost end. The piston 58 has a second piston head 62 located approximately midway along its length and there is an axial passageway 63 through its interior. The passageway 63 communicates through a radial opening 64 with the space in the interior of the liner 49 between the piston heads 59 and 62. The annular chamber 54 exteriorly of the liner 49 between the O-rings 52 and 53 also communicates with the interior of the liner 49 through a series of radial ports 65 drilled through the liner 49. The contact head 61 is drilled to provide a passageway 65 leading from the axial passageway 63 of the piston 68 to the air line 15 which leads to the pneumatic shock absorbers 10.

Thus, when the valve 18 is activated to admit air under pressure into the second air line 19, this air enters the lower end of the feeler mechanism 16 and flows through the passageways 55, the chamber 54 and the radial port 65 into the interior of the liner 49 between the piston heads 59 and 62. From there it flows through the opening 64 into the axial passageway 63 and through the contact head 61 to the line 15 and the pneumatic shock absorbers 10.

Admission of air into the lower end of the liner 49 causes the piston 63 to move upwardly extending the contact head 61 toward engagement with the bracket 11 carried by the chassis frame members 12. If the sprung weight of the body is lower than its standard or "level" spacing, the piston 58 is extended less than its full distance so that the lower piston head 59 does not reach the radial port 65 in the wall of the liner 49 and air continues to flow through the pathway just described into the pneumatic shock absorbers 10, raising the sprung structure of the body. The continued supply of air to the lower end of the piston 58 causes it to continue raising with the sprung structure of the body until the lower piston head 59 crosses the radial port 65. This stops the flow of air from the air line 19 and pressure immediately builds up to the maximum pressure supplied through the activating valve 18 from the air compressor or air tank. When the pressure beneath the lower piston head 59 and the line 17 thus increases, the rear end of the bore 23 (FIG. 1) is immediately raised to the same pressure, by reason of the communicating bypass line 39, and this increase in air pressure exerts force against the rear end of the sealing collar 29 camming the detent balls 36 upwardly out of the V-grooves 34 and pushing the valve plunger 24 to its forward, closed position.

If, on the other hand, the sprung structure of the vehicle is too high i.e., the distance between it and the axle is greater than the normal or "level" spacing, air admitted by the valve 18 to the lower end of the feeler mechanism 16 (FIG. 3) continues to move the piston 58 upwardly until the upper piston head 62 is elevated beyond a second series of radial ports 67 through the wall of the liner 49 near its upper end and until the upper piston head 62 abuts against the collar 50. In this position of the piston 58, the lower head piston 59 has passed above the lower parts 65 and the upper piston head 62 is above the upper ports 67. As a result, the lower portion of the interior liner 49 i.e. that portion now beneath the lower piston head 59 is closed off and air in the second air line 19 and the lower part of the liner 49 immediately increases in pressure to the pressure of the air tank or air compressor and, again, through the bypass line 39 air at this pressure is admitted to the rear end of the bore 23 of the valve 18 to exert force on the rear end of the valve plunger 24 to return it to closed position.

At the same time, however, and independently of the inactivation of the valve 18, air in the pneumatic shock absorbers 10 is vented through the line 15 and through the axial passageway 63 of the piston 58, out of its opening 64 and into upper portion of the interior of the valve liner 49 between the piston heads 59 and 62 in their upper position. From this chamber the air being vented from the pneumatic shock absorbers 10 flows outwardly to the upper radial port 67 and upwardly through an axial opening 68 in the collar 50 to atmosphere. As the pneumatic shock absorbers 10 are vented, the spring structure of the body is lowered until the bracket 11 strikes the contact head 61 of the feeler 16 pushing the piston 58 downwardly until such time that its upper piston head 62 passes below the radial ports 67 which is "level" position.

After the sprung and unsprung structures of the vehicle have reached their "level" position the air in the feeler mechanism 16 gradually bleeds away and gravity restores the piston 58 and feeler head 61 to their lower position as illustrated in FIG. 3. Upon the next change in weight of the unsprung structure of the vehicle, the operator again depresses the pushbutton 25 to initiate the action of the feeler mechanism 16, once again to either admit air to or vent air from the pneumatic shock absorbers 10 and, upon the feeler 16 either moving upwardly to "level" position or reaching its uppermost position, the semiautomatic valve 18 is restored to its closed position by the increased air pressure immediately resulting in the air line 19 and through the bypass line 39 in the rear of the bore 23.

A second, more positive embodiment of this invention is illustrated in FIGS. 6–9 inclusive. In this embodiment of the invention, a first air line 17a is coupled to an inlet port 32a in a body 21a of a valve 18a. The valve 18a also has an outlet port 33a connected by a coupling 69 to a second air line 19a which leads to the feeler mechanism 16 illustrated in FIG. 3. The coupling 69 is T-shaped and also connects a bypass line 39a to a coupling 70 and to the rear of a valve release cylinder 71. In common with the embodiment of the invention illustrated in FIGS. 1, 4 and 5, the second embodiment of the invention includes a valve plunger 24a provided with two valve collars 27a and 28a. The valve plunger 24a has a push button end 25a protruding forwardly into the driver's compartment. The collars 27a and 28a span a distance such that when the push button 25a is depressed, the inlet port 32a is placed in communication with the outlet port 33a and air flows to the second air line 19a and thence to the feeler mechanism 16.

In this second embodiment of the invention the rear end of the valve body 21a is exteriorly threaded and the front, open end of a valve release cylinder 71 is threaded onto the valve body 21a. The rear end of the valve plunger 24a carries a frustoconical catch 72 which extends into a bore 73 in a collar 74 positioned in an annular recess at the rear of the valve body 21a. A coil spring 75 is located around the rear reduced diameter portion of the plunger 24a extending between the back side of the sealing collar 28a and a ring 76 positioned against the inner shoulder of the collar 74. The spring 75 biases the valve plunger 24a forwardly to its closed position.

The collar 74 has a rearwardly extending conical outer surface 77 and is retained in its recess in the rear of the valve body 21a by a bushing 78. A heavier coil spring 79 is positioned between the bushing 78 and the forward end of a valve release piston 80 located interiorly of the cylinder 71. The spring 79 biases the piston 80 rearwardly in the cylinder 71 to the position illustrated in FIG. 6. The piston 80 has a center stem 81 which carries a colletlike set of forwardly extending fingers 82 having radially inwardly extending lips 83 of such size and spacing as to be adapted to engage behind the catch 72 when the valve plunger 24a is pushed to its rear position, as is shown in FIG. 7.

When the vehicle operator depresses the pushbutton 25a to move the valve plunger 24a to "open" position and to place the first air line 17a in communication with the second air line 19a to feeler 16, the spring 75 is compressed and the frustoconical catch 72 is moved through the fingers 82, flexing them outwardly, until the plunger 24a reaches its rearmost position whereupon the fingers 82 snap into place to engage and hold the catch 72 and retain the valve plunger 24a in "open" position.

When the feeler 16 has either been moved up to "level" position if the sprung structure has been too low, or has reached its uppermost position if the sprung structure of the vehicle has been too high, the higher air pressure resulting in the line 19a is applied through the bypass line 39a the rear of the valve release cylinder 71 and to the rear side of the valve release piston 80. This moves the valve release piston 80 forwardly, as is illustrated in FIG. 8, compressing its spring 79 and also moving the fingers 82 forwardly and into engagement with the conical exterior surface 77 of the collar 74. This flexes the fingers 82 outwardly releasing the catch 72 and allowing the spring 75 to thrust the valve plunger 24a forwardly to "closed" position. This moves the rear valve collar 28a to a position intermediate the inlet port 32a and the outlet port 33a and cuts off the flow of air from the compressor or tank to the second air line 17a for the air to the feeler 16.

In this second embodiment of the invention, the coil spring 79 is selected to urge the piston 80 rearwardly with sufficient force so that the piston 80 cannot be moved forwardly except by the sharp increase in air pressure within the valve release cylinder 71 caused the stoppage of the second air line 19a. While the valve release cylinder 71 is shown threaded completely onto the valve body 21a, the force exerted by the spring 79 and thus the pressure needed to move the piston 80 forwardly to release the valve plunger 24a may be adjusted by turning the cylinder 71 backwardly away from the valve body 21a. This embodiment of the invention may thus be adjusted to match the air pressure actually realized in the second air line 19a in any particular installation.

As has been explained, the pressure responsive means in both embodiments of the invention as illustrated in FIGS. 1 and 3–5, inclusive, or in FIGS. 6–9, inclusive, inactivates the retaining means when pressure in the line 19 or 19a from the feeler 16 increases to the line pressure in the first line 17 or 17a from the source of air. This results when the feeler 16 either reaches "level" position on its way up or goes beyond level position to its uppermost position, when the sprung structure of the vehicle is too high.

The same type of increase in pressure results if the load on the sprung structure of the vehicle is so great that the air admitted to the shock absorbers 10, for example, has insufficient force to raise the sprung structure of the vehicle. For example, if the sprung structure is heavily loaded down as by a massive weight in the trunk of an automobile, and thus the sprung structure is below its "level" position and cannot be raised by air fed into the shock absorbers 10, the feeler 16 is unable to move up to its "level" position because its contact head 61 strikes the bracket 11 almost immediately. When this occurs and the bracket 11 does not move upwardly because the load on the sprung structure of the vehicle is too high, air pressure in the line 19 immediately builds up and exerts force against the rear collar 29 of the embodiment of the invention illustrated in FIG. 1 or against the valve relief piston 80 in the embodiment of the invention illustrated in FIGS. 6–9. In such event, a valve embodying the invention is immediately restored to "closed" position to remove the air pressure from the feeler 16.

I claim:

1. In a suspension system for a vehicle which has pneumatic support means extending between the sprung and unsprung structures of the vehicle, a source of air under pressure, a pneumatically extensible feeler for sensing the vertical distance between said structures, and alternatively actuated valve means that are actuated by said feeler for admitting air into said support means when said sprung structure is below a predetermined "level" spacing and for venting air from said pneumatic support means when said sprung structure is above such "level" spacing, in combination, an activating valve, a first air line from said source to said activating valve and a second air line from said activating valve to said feeler, said activating valve comprising, an inlet port for said first air line, an outlet port to said second air line, a valve element movable between closed and open positions, manually operable means for moving said valve element from closed to open position for placing said ports in communication and thereby admitting air to said feeler, means for retaining said valve element in open position, and pressure responsive means in said second air line for inactivating said retaining means in response to the air in said second air line reaching a predetermined pressure when said feeler senses less than "level" spacing and said air under pressure does not raise said sprung structure, and when said feeler extends at least a distance to sense such predetermined spacing between said structures.

2. A valve according to claim 1 in which the valve element has a piston head operatively connected thereto, an air cylinder enclosing said piston head and a bypass air line connecting said second air line to said air cylinder for moving said piston head ans said valve element to closed position.

3. A valve according to claim 1 in which the means for retaining said valve element in open position is a detent that is engageable therewith.

4. A valve according to claim 2 in which the piston head is on the end of the valve element and the cylinder is located on the rear of the activating valve.

5. A valve according to claim 1 in which the means for retaining the valve in open position comprises a catch on the rear end of the valve element and at least one finger adapted to engage said catch to hold said element in rearward, open position and in which there is a spring biasing said element forwardly toward closed position, and the pressure responsive means is operative to disengage said finger from said catch.

* * * * *

PO-1050
(5/69)

UNITED STATES PATENT OFFICE
CERTIFICATE OF CORRECTION

Patent No. 3,618,972          Dated November 9, 1971

Inventor(s) Walter T. Buhl

It is certified that error appears in the above-identified patent and that said Letters Patent are hereby corrected as shown below:

Column 1, line 5, after "in" delete "may" and insert -- my --.

Column 1, line 13, after "vehicle" insert -- results --.

Column 1, line 17, after "'level'" delete "--0".

Column 1, line 24, after "absorbers" delete "of" and insert -- or --.

Column 2, line 64, after "sealing" delete "collars".

Column 2, line 75, after "outlet" delete "part" and insert -- port --.

Column 3, line 11, after "ends" delete "f" and insert -- of --.

Column 3, line 14, after "set" insert -- of --.

Column 3, line 15, after "21" delete "in" and insert -- into --.

Column 4, line 17, after "lower" delete "parts" and insert -- ports --.

Column 4, line 38, after "the" delete "spring" and insert -- sprung --.

Column 5, line 35, after "39a" insert -- to --.

Column 5, line 46, after "for" delete "the".

Column 5, line 51, after "caused" insert -- by --.

Signed and sealed this 23rd day of May 1972.

SEAL)
Attest:

EDWARD M. FLETCHER, JR.        ROBERT GOTTSCHALK
Attesting Officer               Commissioner of Patents